Figure 1:
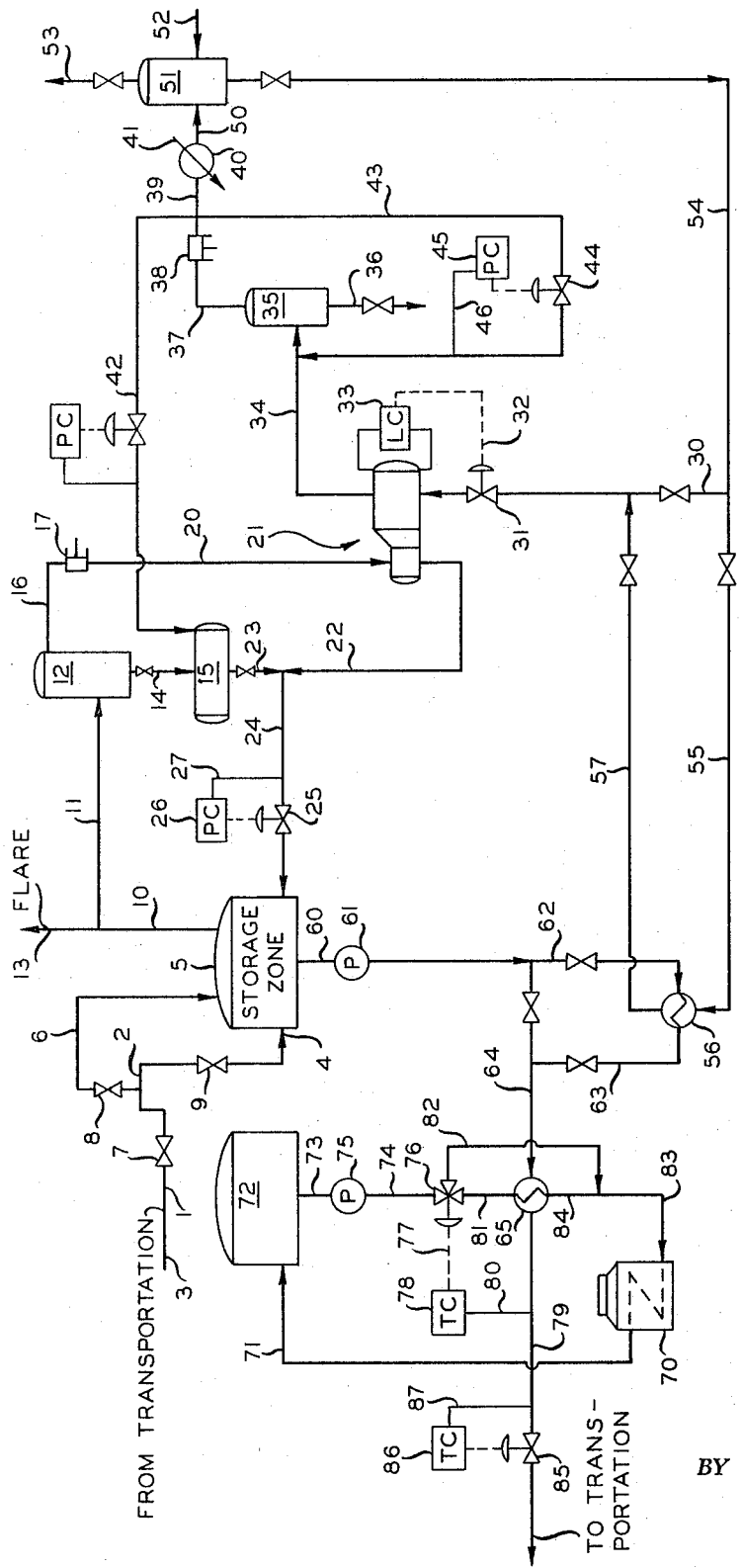

Feb. 14, 1967   J. T. KARBOSKY   3,303,661
FLUID HANDLING
Filed April 30, 1965

INVENTOR
J. T. KARBOSKY
BY
*Young & Quigg*
ATTORNEYS

United States Patent Office 3,303,661
Patented Feb. 14, 1967

3,303,661
FLUID HANDLING
Joseph T. Karbosky, Bartlesville, Okla., assignor to Phillips Petroleum Company, a corporation of Delaware
Filed Apr. 30, 1965, Ser. No. 452,166
5 Claims. (Cl. 62—55)

This invention relates to a method and apparatus for transferring a fluid to and/or removing a fluid from a storage zone.

Liquefied natural gas, liquefied petroleum gas, and other liquefied gases such as propane and the like are generally stored at low temperatures and atmospheric pressures. Vapors formed in the storage zone, as a result of heat flow into the storage zone, are withdrawn in order to maintain substantially atmospheric pressures therein. These withdrawn vapors are then compressed and liquefied by cooling and refrigeration before being returned to the storage zone. The compressor employed in the refrigeration system for the withdrawn vapors generally has a capacity only slightly higher than that which is required to maintain the storage zone at atmospheric pressure under the hottest weather encountered. The conduits through which the liquefied gas is passed from its transportation means, i.e. a tanker, railroad tank car, and the like, to the storage zone are generally at atmospheric temperatures when not in use. Thus, when liquefied gas first begins passing through these conduits it tends to vaporize to a substantial extent, the ultimate result being that the rate of unloading is slowed to a value such that the liquefied gas vaporized in the unloading lines can be handled by the storage zone compressors. Since these compressors have only a slight overcapacity capability, the unloading time is unduly extended. For example, to unload an average ship tanker an additional 12 to 24 hours is required due to the lowered unloading rate.

Also, when such liquefied gases are removed from the storage zone they are generally transferred to a transportation means such as a tanker, truck, pipeline and the like, which is at a higher temperature than the storage zone. Thus, the liquefied gas is heated after removal from the storage zone and the refrigeration capability of that liquefied gas is lost.

It has now been found that the unloading time for liquefied gas through an ambiently or atmospherically heated, i.e. nonexternally cooled, conduit can be effected without the sacrifice of 12 to 24 hours of unloading time by cooling the conduit just prior to unloading by gradually filling such conduit with a cool liquid similar in composition and temperature to that which is to be subsequently unloaded and removing the vapor formed due to vaporization from at least substantially the highest point, preferably each of the highest points, in said conduit. The vapor so formed is passed to a storage zone, preferably the zone into which the subsequently unloaded liquefied gas will pass, to be compressed, cooled and liquefied by the refrigeration system associated with that particular storage zone. Thus, by the time the shipment of liquefied gas is ready to be unloaded the conduit for transferring same is slowly filled with other liquefied gas and the vapors formed upon filling of such conduits are liquefied by the refrigeration system of the storage zone. Shipment of liquefied gas can then be passed through these conduits in the storage zone at a maximum rate without undue vaporization of same.

The apparatus necessary for effecting the above transferal to liquefied gas comprises an ambiently heated first conduit openly connected between the transporting means of the liquefied gas and the desired storage zone and at least one ambiently heated conduit openly connecting one or more of the high points on the first conduit and the storage zone.

It has now been found that when liquefied gas is withdrawn from a storage zone, a minimum capacity refrigeration system can be used with the storage zone if the withdrawn liquefied gas is passed in heat exchange relationship with the at least partially liquefied refrigerant issuing from the compressor means of that refrigeration system.

The apparatus necessary for effecting the heating of the liquefied gas removed from the storage zone comprises a heat exchange means inserted in the refrigeration system downstream of the compression means of that system and a conduit for passing removed liquefied gas through the heat exchange means.

Accordingly, it is an object of this invention to provide a new and improved method for transferring a fluid to and/or removing a fluid from a storage zone. Another object of this invention is to provide a new and improved apparatus for transferring a fluid to and/or removing a fluid from a storage zone.

Other aspects, objects and the several advantages of the invention will be apparent to those skilled in the art from the description, the drawing and the appended claims.

FIGURE 1 diagrammatically shows a system embodying this invention.

Figure 2:
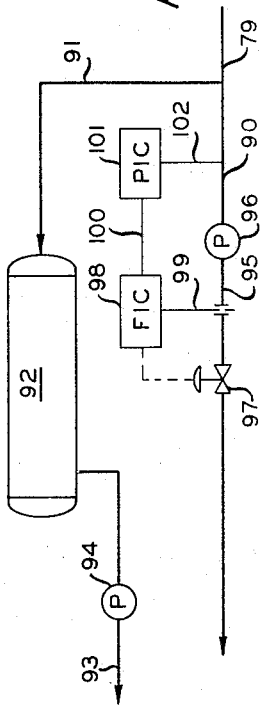

FIGURE 2 diagrammatically shows a modification that can be employed in the system of FIGURE 1.

In FIGURE 1 there is shown an unloading valved conduit 1 having a high point 2. Conduit 1 connects at end 3 to a transporting means or other source of liquefied gas and at end 4 to storage zone 5. The high point 2 of conduit 1 is openly connected to storage zone 5 by valved conduit 6. Storage zone 5 normally contains some liquefied gas. Thus, prior to the arrival of a shipment of liquefied gas at end 3, valve 8 of conduit 1 is partially opened and valve 7 of conduit 1 is kept closed. Liquefied gas then gradually flows from zone 5 throughout the length of conduit 1 thereby cooling the conduit and being vaporized at the same time. Valve 8 of conduit 6 is opened to allow the escape of vapors formed during this cooling process and for the return of same to zone 5. Gradually, conduit 1 will be at least partially, preferably substantially completely, filled with liquid gas a sufficient time prior to the commencement of the unloading of liquid gas from the transportation means to allow the refrigeration system, to be described, for zone 5 to reliquefy the vapors passed thereinto through conduit 6. Thus, when liquid gas is unloaded through conduit 1 no substantial vaporization takes place due to the presence of liquid gas from zone 5 in that conduit and the maximum possible rate of unloading can be employed.

One or more conduits similar to conduit 1 can be employed and these conduits can be of any desired configuration. If a conduit has more than one high point therein, it is preferable that each high point be openly connected with the storage zone. A preferred configuration for conduit 1 is a straight pipe which slants evenly downward from the storage zone to the point at which it connects with the transportatioin means. By use of this configuration a vapor conduit similar to conduit 6 may not even be necessary but if it is, it can be employed closer to the storage zone, for example in the vicinity of valve 6 of conduit 1. The liquid gas passing into conduit 1 prior to the utilization of same for unloading purposes can be supplied in toto from storage zone 5 or can be partially or completely supplied to conduit 1 from a source other than zone 5 (not shown).

The vapor in storage zone 5 is removed therefrom by conduit 10 and passed either by 11 to suction scrubber 12 or by 13 to a flare or both. Generally, the vapors will pass in toto to scrubber 12, the use of the flare being necessary only in times of overpressure. In scrubber 12 the liquid content is separated from the vapor content and passed by 14 to accumulator 15. The vapor content is removed from 12 by 16 and passed to compressor 17 wherein it is compressed and, therefore, partially liquefied and heated. One or more compressors 17 can be employed in series or in parallel depending upon cooling demands made upon the system and variations of those demands. The discharge from compressor 17 passes by 20 through heat exchanger 21 to be cooled, liquefied and then by 22 to join liquid gas in 23 from accumulator 15 in conduit 24. The combined streams of liquid gas in 24 then pass into storage zone 5. The flow of these combined streams through 24 is controlled by motor valve 25 which in turn is regulated by pressure controller 26 which is operatively connected to 24 by line 27. Thus, the pressure in line 24 nearest the junction of lines 22 and 23 exceeds a maximum value preset in pressure controller 26, and motor valve 25 is opened further to allow the flow of more liquid gas into zone 5.

Heat exchanger 21 is supplied with cooled refrigerant by 30, the flow of which into heat exchanger 21 is controlled by motor valve 31 which in turn is controlled through 32 by liquid level controller 33. Thus, if the liquid level in heat exchanger 21 falls below a predetermined minimum value, motor valve 31 is opened further to admit more refrigerant. The refrigerant can be the same material as is stored in zone 5, e.g. propane, or can be any other known commercial refrigerant such as dichlorodifluoro ethane, provided none of the refrigerant is passed into the storage system. Refrigerant vapors are removed from heat exchanger 21 by 34 and passed to suction scrubber 35. Liquid material collected in 35 is removed and disposed of as desired by valved line 36. Vaporous refrigerant is removed from 35 by 37 and passed to compressor 38 wherein it is compressed. The discharge from compressor 38 normally passes by 39 through heat exchanger 40 which is cooled by passing any desired fluid such as sea water, fresh water, and the like, through 41. In certain cases when the refrigerant is the same material as is stored in zone 5 and when desired, part or all of the discharge from compressor 38 can be passed through a valved line 42 into accumulator 15 to maintain a predetermined suction pressure for compressor 37. The discharge from compressor 38 can also pass by 43 out of line 34 and then into scrubber 35. The amount of material passing through 43 is controlled by motor valve 44 which in turn is controlled by pressure controller 45 which is operatively connected by 46 to line 43. Thus, if the pressure in scrubber 35 falls below a minimum value, indicating a lack of vapor passing through 37 to compressor 38, pressure controller 45 will open normally closed motor valve 44 to return the same refrigerant to scrubber 35 and thereby provide pressure for the suction to compressor 38.

The cooled refrigerant from heat exchanger 40 then passes by 50 into receiver 51. It should be noted that here also, depending upon cooling demands made upon the system, one or more combinations of compressors followed by heat exchangers can be employed. Additional refrigerant, e.g. pure propane, can be added to the system by means of valved line 52. Vapor present in receiver 51 can be removed by 53 if overpressuring occurs and disposed of as desired, e.g. in the case of liquefied hydrocarbons passed to a flare. Normally, no vapor is removed by 53 and the liquid contents of receiver 51 are passed by 54 to heat exchanger 21 by way of line 30 or by way of valved line 55, heat exchanger 56 and valved line 57 or both.

Liquefied gas is removed from zone 5 through 60 by pump 61. This liquefied gas can be passed by 62 through heat exchanger 56 and by 63 to line 64. Thus, the relatively cool liquefied gas from storage zone 5 is passed in indirect heat exchange relationship with the relatively warmer refrigerant in line 55. By this contacting the refrigeration potential of the cold liquefied gas is utilized to cool the liquefied refrigerant of the refrigeration system for storage zone 5.

If further heating of the liquefied gas in 64 is required, such can be achieved by the use of heat exchanger 65. A suitable fluid such as water, ethylene glycol and the like is heated in heater 70 and passed by 71 to surge tank 72. The heating medium is removed from 72 through 73 and 74 by pump 75 as desired. The heating medium in 74 passes to three-way motor valve 76 which is controlled through 77 by temperature controller 78. Temperature controlled 78 is operatively connected to 79 by 80. The heating medium passing into motor valve 76 can pass through 81 into heat exchanger 65 or 82 into line 83 or both depending upon the temperature of the liquefied gas in 79. Heating medium passing into heat exchanger 65 from 81 passes out of that heat exchanger by 84 into 83. The combined heating medium streams from 82 and 84 pass by 83 into heater 70 to be reheated. Thus, if the temperature of the liquefied gas in 79 exceeds a predetermined temperature, temperature controller 78 will adjust motor valve 76 so that some or a larger amount of heating medium bypasses heat exchanger 65 by means of line 82.

The flow of liquefied gas through 79 is finally regulated by motor valve 85 which in turn is controlled by temperature controller 86 which is operatively connected by 87 to 79. Thus, if the temperature of the liquefied gas in 79 falls below a predetermined temperature, motor valve 85 will be pinched down to substantially stop the flow of liquefied gas to heat exchanger 65. After passing through motor valve 85, the liquefied gas in 79 is passed to storage, transportation means and the like.

If more than one point of supply is desired, several lines similar to line 60 can be run from zone 5. Each separate line can employ a separate heat exchanger 56 and 65, and the related apparatus, or can use a single heat exchanger 56 and 65, and the related apparatus, as desired.

FIGURE 2 shows a modified flow control system wherein the liquefied gas in 79 is split into line 90 and line 91 to provide two points of supply. Valved line 91 passes into storage tank 92 and is removed therefrom through 93 by pump 94 as desired. The liquefied gas in 90 is moved through 95 by pump 96 to, for example, a pipeline. The flow of liquefied gas through 95 is controlled by motor valve 97 which in turn is controlled by flow indicator controller 98 which is operatively connected to 95 by 99. Flow indicator controller 98 is in turn reset through 100 by pressure indicator controller 101 which is operatively connected to 90 by 102. Thus, if the pressure on the upstream side of pump 96 decreases below a predetermined minimum value, pressure indicator controller 101 will reset flow indicator controller 98 so as to allow less liquefied gas to flow through 95 by opening motor valve 97 further.

*Example*

Prior to the arrival of a shipment of commercial propane in a tanker ship, other commercial propane at a temperature of —50° F. is allowed to gradually pass from storage zone 5 into conduit 1. Valve 8 of conduit 6 is opened and any propane vapors formed in conduit 1 pass from conduit 1 through conduit 6 into storage zone 5. After about 3 or 4 days conduit 1 is substantially completely filled with liquid propane at a temperature of about —50° F. At his time propane from the tanker ship is passed into conduit 1 at end 3 at a temperature of —50° F. and a pressure of 50 p.s.i.g. Due to the low rate of vaporization in conduit 1 caused by conduit 1 being full, cold liquid propane from the tanker is unloaded at a rate of 5145 gallons per minute. The unloading time for the tanker is about 24 hours.

Propane vapors are removed from storage zone 5 at a temperature of —50° F. at a rate of 6481 pounds per hour and passed into scrubber 12. The vapors from scrubber 12 pass into compressor 17 at a rate of 6481 pounds per hour. The discharge from compressor 17 passes into heat exchanger 21 at a temperature 80° F. and a pressure of 30 p.s.i.g. The discharge 22 from heat exchanger 21 is at a temperature of −34° F. and a pressure of 25 p.s.i.g. This propane combined with propane from accumulator 15 to form composite stream 24 which is returned to storage zone 5. Propane refrigerant vapor is removed from heat exchanger 21 through 34 at a temperature of −44° F., a pressure of 0.5 p.s.i.g. at a rate of 7877 pounds per hour to scrubber 35. Propane is removed from scrubber 35 at 7877 pounds per hour. The discharge from compressor 38 is at 142° F. and 140 p.s.i.g. prior to passing to heat exchange 40 and is at about 75° F. and 140 p.s.i.g after passing through heat exchanger 40. Sea water at 65° F. and 30 p.s.i.g. is passed at a rate of 420 gallons per minute through heat exchanger 40 and is removed therefrom at a temperature of 75° F. Propane from receiver 51 at a pressure of 140 p.s.i.g. is passed to heat exchanger 56. The propane enters heat exchanger 56 and leaves heat exchanger 56 at −40° F. at a rate of 7877 pounds per hour. The propane leaving heat exchanger 56 passes into heat exchanger 21.

Propane is removed from storage zone 5 as −50° F. This propane passes through heat exchanger 56 in heat exchange relationship with the propane and enters heat exchanger 56 at −50° F. and leaves heat exchanger 56 at −32° F. The propane then passes into heat exchanger 65 and leaves heat exchanger 65 at 35° F. and 116 gallons per minute. A 60 weight percent aqueous ethylene glycol solution is heated by heater 70 to a temperature of 150° F. and passes to surge tank 72. The ethylene glycol solution at 150° F. is circulated at a rate of 64 gallons per minute through three-way motor valve 76 and thence, at least in part, through heat exchanger 65.

Reasonable variations and modifications are possible within the scope of this disclosure without departing from the spirit and scope thereof.

I claim:

1. A method for transferring a cool liquid from a source to a storage zone through an ambiently heated conduit, said storage zone having associated therewith a refrigeration system including a compression zone for at least partially liquefying refrigerant vapors and means for removing cool liquid from said storage zone comprising gradually filling said ambiently heated conduit with cool liquid similar to that in said source, removing vapor from said ambiently heated conduit and returning same to at least one of said source and said storage zone, transferring the liquid from said source into said storage zone through said ambiently heated conduit, removing cool liquid from said storage zone and passing same in heat exchange relationship with said at least partially liquefied refrigerant to cool same and to heat said cool liquid from said storage zone.

2. A method for transferring a liquefied hydrocarbon gas from a source thereof to a storage zone through a nonexternally cooled conduit, said storage zone having associated therewith a refrigeration system that utilizes hydrocarbon gas from said storage zone as refrigerant and which includes a compression zone followed by a heat exchange zone for at least partially liquefying refrigerant vapors and means for removing cool liquid from said storage zone comprising gradually filling said conduit with liquefied gas from said storage zone to cool said conduit, removing vapor from at least one of the highest points in said conduit and returning same to said storage zone, transferring the liquid from said source into said storage zone through said cooled conduit after said conduit is substantially completely filled with liquefied gas, removing liquefied gas from said storage zone and passing same into an indirect heat exchange relationship with said at least partially liquefied refrigerant to further cool and further liquefy said refrigerant while at the same time heating said liquefied gas removed from said storage zone.

3. Apparatus for transferring a cool liquid from a source thereof to a storage means and for removing cool liquid from said storage means comprising an ambiently heated first conduit openly connecting said source and said storage means, an ambiently heated second conduit openly connecting said first conduit and at least one of said source and said storage means, means other than that associated with said source for transferring cool liquid into said first conduit, a first heat exchange means, a third conduit openly connecting said storage means and said first heat exchange, means for removing cool liquid from said storage means through said first heat exchange means, refrigeration means including a compression means for compressing refrigerant vapors and a second heat exchange means, a fourth conduit openly connecting said compression means and said first heat exchange means, a fifth conduit openly connecting said fourth conduit of said first heat exchange means and said second heat exchange means.

4. Apparatus for transferring a liquefied gas from a source thereof to storage means of said liquid and for removing liquefied gas from said storage means comprising at least one nonartificially cooled first conduit openly connecting said source and said storage means, at least one nonartificially cooled second conduit openly connecting at least substantially the highest point on said first conduit and at least one of said source and storage means, a first heat exchange means, a third conduit openly connecting said source and said first heat exchange means for removing cool liquid from said source through said first heat exchange means, refrigeration means including a compression means for compressing refrigerant vapors followed in series by said first heat exchange means and a second heat exchange means for cooling fluid with the refrigerant of said refrigeration means, a fourth conduit openly connecting said compression means and said first heat exchange means, a fifth conduit openly connecting said fourth conduit in said first heat exchange means and said second heat exchange means.

5. Apparatus for transferring a liquefied hydrocarbon gas from a source thereof to a storage means of said liquefied gas and for removing liquefied gas from said storage means comprising a nonexternally cooled first conduit openly connecting said source and said storage means, a nonexternally cooled second conduit openly connecting at least one of the highest points on said first conduit and said storage means, means associated with said storage means for gradually removing liquefied gas therefrom into said first conduit, a first heat exchange means, a third conduit openly connecting said storage means and said first heat exchange means for removing said liquefied gas from said storage means through said first heat exchange means, refrigeration means including in series a compression means for compressing refrigerant vapors, a second heat exchange means for cooling said compressed vapors and a third heat exchange means for cooling a fluid with refrigerant of said refrigeration means, a fourth conduit openly connecting said compression means and said second heat exchange means, a fifth conduit openly connecting said fourth conduit in said second heat exchange means, said first heat exchange means, and a sixth conduit openly connecting said fifth conduit in said first heat exchange means and said third heat exchange means, and a seventh conduit openly connecting said sixth conduit in said third heat exchange means and said compression means.

References Cited by the Examiner

UNITED STATES PATENTS

| | | | |
|---|---|---|---|
| 2,487,863 | 11/1949 | Garretson | 62—55 |
| 2,682,154 | 6/1954 | Wilkinson | 62—54 |
| 2,895,305 | 7/1959 | Reed | 62—55 X |
| 3,093,974 | 6/1963 | Templer et al. | 62—55 X |
| 3,097,498 | 7/1963 | Williams | 62—55 |
| 3,112,617 | 12/1963 | Tafreshi | 62—55 X |

LLOYD L. KING, *Primary Examiner.*